MAGNETIC RECORDING SYSTEM WITH A DISABLED BIAS OSCILLATOR DURING THE VERTICAL SYNCHRONIZATION INTERVAL

Filed Aug. 18, 1966

United States Patent Office 3,504,116
Patented Mar. 31, 1970

3,504,116

MAGNETIC RECORDING SYSTEM WITH A DISABLED BIAS OSCILLATOR DURING THE VERTICAL SYNCHRONIZATION INTERVAL

Fujio Sato, Motonori Fukatsu, and Katsuyuki Iwai, Tokyo, Japan, assignors to Akai Electric Company Limited, Tokyo, Japan Filed Aug. 18, 1966, Ser. No. 573,410
Claims priority, application Japan, Feb. 25, 1966, 41/11,433
Int. Cl. H04n 5/78, 5/04
U.S. Cl. 178—6.6 4 Claims

ABSTRACT OF THE DISCLOSURE

A magnetic recording system for making direct magnetic recordings of television signals is disclosed. The system employs a high frequency bias signal which is reduced to negligible proportions during the regular blanking periods in the television signal. This is accomplished by means of a gate which normally passes the bias signal to the recording head or a separate bias head. A sync separator and a monostable multivibrator detect the sync pulses in the television signal and disable the gate during the blanking periods.

BACKGROUND OF THE INVENTION

Field of the invention

This invention relates to improvements in and relating to magnetic tape recorders. More specifically, it relates to a magnetic recording system adapted for magnetically recording television signals on an elongated magnetic medium such as magnetic tape in the direct way, or without relying upon the high frequency modulation technique for improving the quality of the thus recorded information.

Description of the prior art

In the conventional video tape recorders, generally speaking, a high frequency biasing signal is impressed upon the television signal either in an electrical or in a magnetic way, so as to carry out the magnetic recording relying upon the straight range of the B-H curve, so-called, of the magnetic material on the tape, for minimizing otherwise possible distortion of the television signal in the course of recording on the tape.

In this case, the bias frequency signal is generated in an electronic oscillator independently of the television signal fed from a television set to the tape recorder. It has now been found that, especially with use of lower frequency bias signal, white-and-black horizontal strips frequently appear on the screen upon which the recorded and reproduced signal through the recording and reproducing machine is projected. Through our experiments, we have found that the generation of such irritating noise strips on the reproducing television screen is mainly attributable to phase difference between the synchronizing signal pulses contained in the processing television signal and the bias frequency signal impressed thereto, which difference being caused to appear on account of the aforementioned relative independent nature of generating function of the two signal sources. It could be therefore conceivable that the rising or lowering edges of a series of synchronizing pulses, hereinafter briefly referred to as "sync pulses," contained in the television signal are subjected generally to variable biasing effects by the bias signal, even when the latter be of an ideal constant frequency, as will be more specifically described hereinafter, leading to an irregular shaping of the sync pulses in the course of reproduction thereof.

SUMMARY OF THE INVENTION

It is therefore the main object of the present invention to provide an improved direct magnetic recording system relying upon the high frequency biasing technique, capable of avoiding substantially the recording of irregularly biased sync pulses of the television signal, giving rise to developing irritating white-and-black horizontal noise strips on the television screen when the television signal is reproduced and projected thereon in the form of visual images.

Starting from a conventional magnetic recording system adapted for magnetically recording television signals on an elongated magnetic medium in a direct way, comprising an input means connected to a television set and the like signal source for receiving therefrom a television signal, amplifier means adapted for amplifying the signal, a sync pulse separator for separating sync pulses from the television signal, magnetic record head means for receiving either said amplified television signal per se or video signal absent of sync pulses, without processing in a high frequency modulation means, and a high frequency biasing oscillator or its homologue connected to said record head for supplying a biasing signal wave to said head in an over-lapped manner electrically or magnetically, the invention is characterized in that means are provided to reduce said biasing signal wave to a practical nil in the course of regular blanking periods in the television signal, while keeping the video signal components of the latter biased in the regular way.

BRIEF DESCRIPTION OF THE DRAWING

Further objects, features and advantages of the invention will become more clear from the following detailed description taken in conjunction with the accompanying drawings, in which.

DESCRIPTION OF THE PREFERRED EMBODIMENTS

Figure 1:
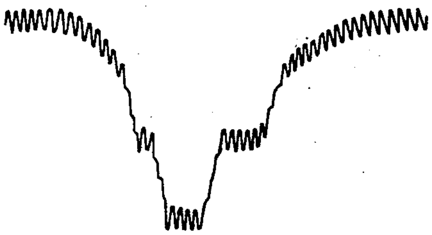
FIG. 1 is a schematic wave form of part of a recorded television signal with a high frequency biasing signal overlapped therewith.
Figure 2:
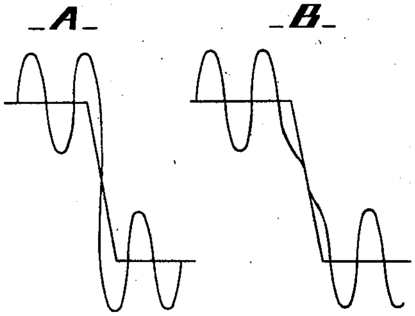
FIGS. 2(A) and (B) is an enlarged schematic diagram of two examples of sync pulses shown substantially at their lowering edges only, illustrating different biasing effects of the biasing signal upon the edges of different sync pulses of a television signal caused by the generally encountered phase difference.

Before entering into describing several embodiments of the present invention, a brief illustration will be made of the comparative conventional technique in reference to FIGS. 1–2 of the accompanying drawings.

When a biasing frequency is impressed upon a television signal, the number of repeated cycles and the degree of bias are generally differently observed, especially in the range of the rising and lowering edges of series of sync pulses contained in the television signal. In FIGS. 2(A) and (B), two different modes of influence by biasing signal as appearing at the region of lowering edges of sync pulses are illustrated only by way of example. This kind of different influence is rather predominant with lower frequency biasing signals. In this case, a kind of beat will be invited to be generated.

On the other hand, when reproducing the recorded television signal on a magnetic video tape recorder and the like employing the direct recording and direct reproducing technique, the desired perfect equalization of the reproduced signal can not practically be carried into effect, in consideration of smaller signal-noise ratio thereby realized and of a broader frequency band of the signal to be processed. Thus, the amplitude of sync pulses contained in a reproduced television signal depends substantially upon the recorded conditions of the lowering edge or initiating part of each of the pulses, even after processed in a conventional equalizer provided in the reproducing system.

In other words, the signal transmission performance of the tape system is highly limited so that when signals contain therein higher frequency signal components as in the case of television signals are to be recorded, the relative speed between magnetic head and tape must be considerably increased in comparison with that normally employed in the conventional audio tape recorders, which will, however, correspondingly adversely affect lower frequency signal transmission characteristics, resulting in a reduced signal-noise ratio. For this reason, the aforementioned deficient equalization effect will be encountered and the output will show a slight degree of differentiating effect which means that with a higher frequency of the reproduced signal the output may generally have a higher value.

More specifically, when the biasing signal be applied to a television signal in the region of a sync pulse contained in the latter signal as shown in their phase relationship in FIG. 2(A), the amplitude of the pulse when reproduced will become larger than that of the desired standard value. On the other hand, when the biasing signal is impressed upon a sync pulse at its lowering edge in a different manner such as shown schematically in FIG. 2(B) by way of example, the reversed effect will be observed. Therefore, it may generally be concluded that when a television signal which has been impressed with a high frequency biasing signal is magnetically recorded in the direct manner and then reproduced by means of magnetic reproducing head, the thus provided sync pulses will present various and different amplitudes. When such a television signal including variable sync pulses is subjected to a D.C.-restoration as in the conventional manner, the video signal will also be subjected to a similar degree of unintentional fluctuation, thereby generating horizontal black-and-white noise strips on the television screen.

In the conventional video tape recording technique, the frequency of the impressed biasing signal is increased considerably, to a higher value such as 10 mc./s., for avoiding the aforementioned drawbacks, so as to increase the repeating frequency at the region of the lowering edge of each of the sync pulses, thus much as possible the biasing effect in the region as a rule. With use of higher frequency biasing signal, however, the impedance of the record coil of recording magnetic head will become correspondingly higher so that the power to be supplied to the biasing oscillator should be increased in a corresponding manner which causes a considerable loss of energy.

Another counter measure employed in the conventional techninue for avoiding the aforementioned drawbacks is to reduce the strength of the recording current. This, however, causes a reduction of the signal-noise ratio.

Figure 3:
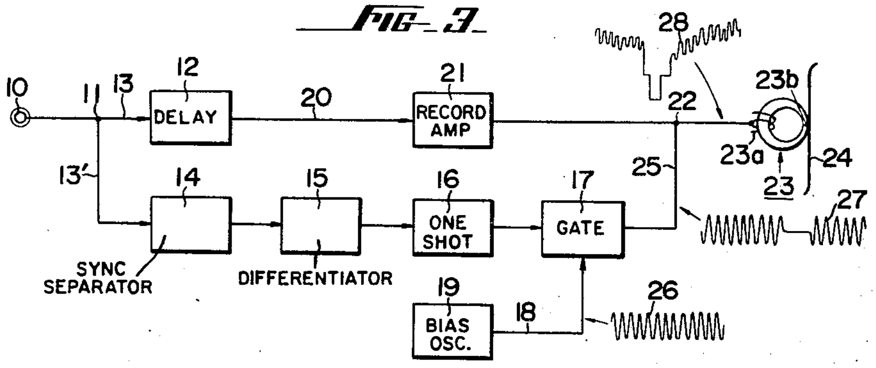
FIG. 3 is a schematic block diagram illustrative of a preferred embodiment of the novel recording system.

Next referring to FIG. 3, 10 denotes an input terminal which is arranged to receive television signals from, for instance, a television receiver, vidicon camera or the like conventional signal source, not shown. The terminal 10 is electrically connected through a junction point 11 and conductor 13 with a delay circuit 12 which may be of conventional design and thus only schematically illustrated in a block.

From junction point 11, a lead 13' extends to a sync pulse separating circuit 14 which may be again of any conventional design familiar to that commonly employed by those skilled in the art and thus only schematically shown by a rectangular block which applies also to several other circuit constituents, although not always specifically referred to.

Sync pulse separating circuit 14 is electrically connected at its output to the inlet of differentiating circuit 15, the outlet of the latter being connected in turn with the inlet of a monostable multivibrator 16 of a conventional design which may be one of those highly familiar to skilled magnetic tape recorder designers. The design of the differentiating circuit 15 may also be of conventional design familiar to skilled television engineers.

Multivibrator 16 is connected at its output to the first input of gate circuit 17, while the second input of the latter is connected through conductor 18 with the output of a biasing oscillator 19 which may be of any conventional design.

Delay circuit 12 is connected at its output through conductor 20 to the input of a conventional record amplifier 21, the output of which is connected through junction 22 to the working coil 23*a* of a stationary record magnetic head 23 which is designed to cooperate with an elongated magnetic tape 24, shown only schematically, through the intermediary of a conventional slit gap 23*b* formed in the core of said head 23.

Gate circuit 17 is connected at its output through conductor 25 to the aforementioned junction 22.

In the operation, the television signal is fed through input terminal 10, junction point 11 and lead 13' to the synchronizing separator 14 for taking out therefrom only its sync pulses, which pulses are then conveyed to a differentiating circuit 15. The thus differentiatingly processed sync pulses are conveyed to multivibrator 16 for triggering the latter. The time constant of the multivibrator is selected to be equal to a sum of the duration period of a sync pulse plus neighboring porches. It will be therefore clear that from the output of multivibrator 16, a series of signal pulses may be derived, if a continued television signal is impressed upon the input terminal 10, each of said output pulses extending for the blanking interval. These pulses are then fed to gate circuit 17, which is arranged to receive the output signal as at 26, of a high frequency biasing oscillator 19 through conductor lead 18.

The gate circuit 17 is gated by output signals from the multivibrator 16 so that the delivered output signal at 27 may have corresponding regularly spaced complete interruptions (or substantially weakened depressions, although not shown), extending over each of the blanking intervals contained in the television signal.

On the other hand, the television signal fed to delay circuit 12 is subjected as a whole therein to a delay or time lag, 1.3 $\mu$s. or 0.02H minimum (H being the period ranging from the starting point of a scanning line to that of the next succeeding scanning line), equal to the length of the front porch from the sync pulse, and the output from the circuit 12 is conveyed through lead 20 to amplifier 21. The thus delayed and amplified television signal is mixed at junction point 22 with the modified biasing signal delivered from the output of gate circuit 17, the latter signal being either deficient of energy in effect or having only a lower voltage level at every blanking intervals as already described. The resulted combined signal which is fed to record winding 23*a* on record head 23 is shown only schematically at 28 by way of example. As seen, the recording signal in this case is deficient of otherwise impressed biasing signal at all blanking intervals, each of the latter comprising a sync pulse extending for 5.1 $\mu$s. or 0.08H in the mean, and neighboring front and back porches, the back porch of which extends for 3.8 $\mu$s. or 0.06H. Therefore, it will be observed from the foregoing that with use of the recording signal modified in the aforementioned manner the grave drawback inherent in the conventionally recorded and reproduced signal which is frequently caused by the various and different influences on the sync pulses of the television signal processed for the magnetic tape recording and reproducing purpose. Thus, the recorded and reproduced television signal in accordance with the present novel teaching does not suffer from otherwise possible variation in the reproduced sync pulses.

Figure 4:
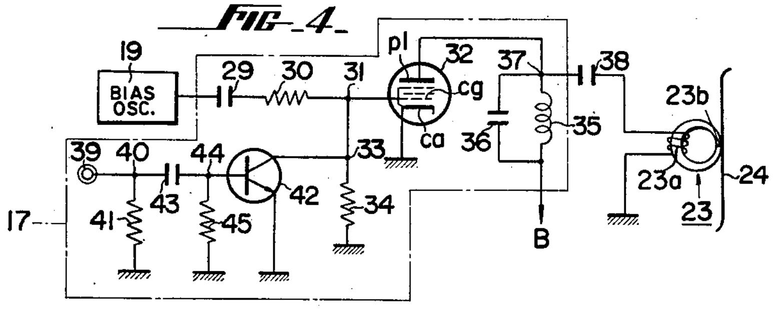
FIG. 4 is a circuit diagram of gate circuit employed in the embodiment shown in FIG. 3.

In FIG. 4, an embodiment of the circuit adapted for modifying the biasing signal in the above mentioned manner is shown.

In this embodiment, the output of biasing oscillator 19 is electrically connected through coupling condenser 29, resistor 30 and junction point 31 to control grid *cg* of output tube 32, said grid being connected through junctions 31, 33 and resistor 34 to ground. The cathode, at *ca*, of tube 32 is grounded, while the plate, at *pl*, of the tube is electrically connected to a B voltage source through the agency of a local circuit comprising coil 35 and a condenser 36, as shown. On the other hand, the plate *pl* is electrically connected through junction 37 and a condenser 38 to one end of the record winding 23*a*, said junction 37 being selected to be identical with that denoted by 22 in FIG. 3, while in practice the other end of the winding 23*a* is connected to ground.

Through input terminal 39 which may be positioned in the connecting lead between the two blocks 16 and 17, FIG. 3, and in addition is connected to ground through junction 40 and resistor 41, a gating signal is fed from multivibrator 16 to the base electrode of transistor 42, via junction 40, condenser 43 and junction 44, said latter junction 44 being connected through resistor 45 to ground. The emitter electrode of the transistor is also connected to ground as shown, while the collector electrode is connected electrically through both junctions 33 and 31 to the control grid *cg* of the tube 32.

The oscillative output voltage from biasing amplifier 19 is therefore impressed through condenser 29 and resistor 30 to the control grid *cg*, while the power-amplified biasing signal from the tube 32 is impressed via condenser 38 to the record winding 23*a* as is commonly known for the biasing purpose.

Each of the output pulses delivered from multivibrator 16 fed through input terminal 39 is applied through condenser 43 to the base-emitter circuit of transistor 42. During the period in which the base-emitter circuit is energized in the aforementioned way, the collector-emitter passage of the transistor 42 is conductive, and the oscillatory output voltage from biasing oscillator 19 is therefore conveyed to ground through the transistor. During this period, the control grid *cg* of tube 32 is not energized and thus the record head 23 does not deliver any biasing magnetic flux from recording slit gap 23*b*. Therefore, the recorded television signal on the tape 24 through the record gap 23*b* is practically not biasedly influenced at the regular blanking intervals.

Figure 5:
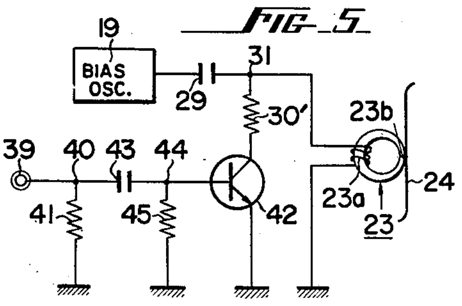
FIG. 5 is a circuit diagram of a modification from the circuit shown in FIG. 4.

In FIG. 5, a slightly modified arrangement from that shown in FIG. 4 is illustrated. In this modified embodiment, reference symbols 19, 23, 23*a*, 23*b*, 24, 29, 31, 39, 40, 41, 42, 43, 44 and 45 denote similar parts as before, while resistor 30 is transferred from the position between 29 and 31 to the new position at 30 in the collector-emitter passage of the transistor 42.

In operation, the biasing signal from oscillator 19 is normally applied through condenser 29 and junction 31 to the record winding 23*a* for assisting the desired magnetic recording on the tape 24, in the way of biasing.

At the same time, the periodical pulses supplied from multivibrator 16 and covering each blanking interval contained in the applied television signal are conveyed to the base-emitter passage of transistor 42, thereby the passage being made conductive intermittently and the biasing signal delivered from the oscillator 19 being by-passed through junction point 31, resistor 30′ and the collector-emitter passage of transistor 42 to ground. In this instant, therefore, the biasing signal from the oscillator 19 to the record head 23 is interrupted. It will be clear from the foregoing that the television signal impressed on the record head is practically deprived intermittently of biasing signal during each of the blanking intervals, the resulting recorded signal being of the form shown schematically at 28 in FIG. 3. Although the record head 23 is fed with the thus modified biasing signal in an overlapped manner with the television signal to be recorded, a separate biasing magnetic head may be arranged so as to receive separately the biasing signal only and substantially in physical opposition to the regular record head, as is commonly known as the cross field system. Instead of interrupting periodically the biasing signal in effect, a considerable and periodic reduction of the biasing signal voltage may be carried into effect by performing minor modification of the circuit constituents, as will be easily thought out by those skilled in the art.

As will be well supposed, the principle of the invention may equally be applied to the color television signal recording system.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What we claim is:

1. In a magnetic recording system adapted for magnetically recording television signals on an elongated magnetic medium, comprising an input means connected to a television signal source for receiving therefrom a television signal, amplifier means adapted for amplifying the signal, a synchronizing signal separator for separating sync pulses from the television signal, magnetic record head means for receiving either said amplified television signal per se or video signal absent of sync pulses, without processing in a high frequency modulation means, a high frequency biasing oscillator connected to said record head for supplying a biasing signal wave to said head means electrically or magnetically and means for reducing said biasing signal to negligible proportions in the course of regular blanking periods in the television signal, while keeping the video signal components biased in the regular way.

2. Magnetic recording system as set forth in claim 1, wherein said head means comprises one and the same head.

3. Magnetic recording system as set forth in claim 1, wherein said head means are divided into two heads in the manner of the cross-field system, one of which is connected for the reception of said amplified television signal per se or video signal absent of sync pulses, the other of said two heads being connected to receive said biasing signal wave.

4. Magnetic recording system as set forth in claim 1, further comprising means for delaying the television signal by a short time equal to the length of the front porch in the signal, means responsive to said synchronizing signal separator for intermittently interrupting the bias energy during the blanking periods in the television signal, and means for mixing said two kinds of signals together.

References Cited

UNITED STATES PATENTS 3,180,929 4/1965 Hibbard et al.
3,368,032 2/1968 Gooch et al.

ROBERT L. GRIFFIN, Primary Examiner

DONALD E. STOUT, Assistant Examiner

U.S. Cl. X.R.

178—69.5